United States Patent Office 3,291,557
Patented Dec. 13, 1966

3,291,557
ALKYL DICARBOXYLIC ACID TREATMENT
OF LEATHER
Maynard B. Neher and Nicholas D. Gallagher, Columbus, Ohio, assignors, by mesne assignments, to The Battelle Development Corporation, Columbus, Ohio, a corporation of Delaware
No Drawing. Filed Jan. 7, 1963, Ser. No. 249,607
16 Claims. (Cl. 8—94.22)

This invention relates to treating leather with alkylated dibasic acid agents to provide resistance to water penetration with the treated leather free from undesirable spew formation. More particularly, the invention concerns impregnating leather with various alkylated dibasic acid agents, including alkylmalonic acid agents, and also concerns treatment of blends of dibasic acid agents and high-boiling liquid materials to provide blends which, upon application to leather, result in treated leather which remains free of undesirable spew formation.

For over a decade, some alkylated dibasic acids have been known to be useful waterproofing agents for leathers. As illustrated by U.S. Patent No. 2,693,996, Von Fuchs, it has been known to treat leathers with certain alkylated succinic acids, for example iso-octadecenyl succinic acid, to render the leather resistant to water penetration. This waterproofing treatment of leather with an alkylated succinic acid (ASA) has had significant commercial value and has provided leathers which have been waterproofed without detrimental modification of other properties, such as the leather's porosity. However, on occasions, leathers waterproofed with ASA agents have developed a most undesirable powdery exudate or spew on their surfaces. Spew formation, while apparently not detrimental to the leather's resistance to water penetration, has been disadvantageous in that it detracts significantly from the attractive appearance of the waterproofed leather. For example, spew on shoe upper leather creates a quite unattractive appearance requiring frequent removal and repolishing. This spew when wiped and/or washed off, shortly reappears from additional exudation or formation of spew. Thus, in the art there has existed a need for knowledge as to the causes and occurrences of such an exudate or spew and of a method for eliminating and avoiding spew formation in these treated leathers.

In commercial practice, low-cost olefin mixtures are used to produce ASA agents with the resulting ASA agents being complex mixtures of ASA compounds. Thus, rarely is other than a mixture of several ASA agents employed for commercial leather treatments. For example, the reaction of an olefin with maleic anhydride produces an alkenyl succinic anhydride, which when hydrated with water produces the corresponding alkenyl succinic acid (L. H. Flett and W. H. Gardner, Maleic Anhydride Derivatives; Reaction of the Double Bond, John Wiley & Sons, Inc., 1952). If a straight-chain alpha olefin is used, the reaction produces a single product, a straight-chain ASA. If a straight-chain olefin which does not have end unsaturation (i.e., one which is not an alpha olefin) is used, the reaction may occur at either end of the double bond, and two products, referred to as singly-branched ASA's are obtained, although if the olefin is symmetrical (i.e., the double bond is in the middle of the olefin), these two products are identical. If the olefin used in the reaction has alkyl groups substituted along the chain, the resulting ASA product will have additional branching in the chain and generally be referred to as a multiply-branched ASA. Thus, for example, if there is used in the reaction an olefin mixture consisting essentially of $C_{18}$ olefins of which a portion is alpha olefins, another portion is straight-chain olefins with the double bond in other than the alpha position, and another portion is branched olefins, the resulting ASA product consists of a complex mixture of $C_{18}$ straight-chained ASA's, $C_{18}$ singly-branched chain ASA's, and $C_{18}$ multiply-branched ASA's, each of which has somewhat different properties. In the chemical shorthand notation used to describe these compounds, a $C_nASA$ is an alkylated succinic acid in which the hydrocarbon tail contains $n$ carbon atoms and the whole molecule contains $n+4$ carbon atoms. Thus, a $C_{20}ASA$ molecule contains 24 carbon atoms and the hydrocarbon substituent group thereof contains 20 carbon atoms. In particular, the hydrocarbon group of the agent is an acyclic group consisting of carbon and hydrogen atoms, and may be an alkyl, alkylidene, or alkylene radical.

ASA compounds, which are useful waterproofing agents for leather possess a hydrocarbon tail and a carboxyl polar group. The straight-chained ASA's are crystalline solids if the hydrocarbon tail is longer than 10 carbon atoms. With a hydrocarbon tail longer than 10 carbon atoms, the ASA's are essentially completely insoluble in water. The branch-chain ASA's containing from about 13 to 26 carbon atoms in their hydrocarbon tail are liquids whose viscosity increases as branching increases. The liquid agents usually are light yellow to pale amber colored. In pure form, the solid products are white. In general, for an ASA compound to be an effective waterproofing agent for leather, the minimum size of the hydrocarbon tail is about 13 carbon atoms, with from about 20 to 24 carbon atoms being desirable for optimum waterproofness. In the branched-chain ASA compounds as the number of carbon atoms in the hydrocarbon tail increases above about 24, the compounds tend to be solids at ordinary temperatures with a resulting decreased efficiency in their leather waterproofing properties. The ASA agent and its hydrate should be a liquid or a low melting wax or amorphous solid to provide significant leather waterproofing at ordinary temperatures. In general, branched-chain ASA's are most effective waterproofing agents for leather. Solids or semisolids ASA's are useful in combination with high-boiling liquid materials, such as petroleum oils, for waterproofing a leather, if the resulting blend of the solid or seimsolid ASA with the liquid material is a liquid at the temperature at which the leather is treated and at temperatures at which the treated leather will be used.

In conventional treating of leather with an alkylated dibasic acid agent to render the leather waterproofing, the agent is applied in any of a number of different ways. Choice of a method and technique usually is influenced by the particular leather and its condition, the apparatus available, and the particular agent or agents being applied. In some instances, the agents are solubilized, as by organic solvents, and applied very conveniently while in solution. In other cases, water emulsions of the agents are applied. In still other cases, the agent itself is applied directly. In many instances, the agent is blended with a petroleum oil, such as mineral oil, or other high-boiling liquid material and this blend applied.

In a manner akin to the ASA agents, the alkylated malonic acids possess leather water-proofing properties. Like the ASA compounds, an alkylated malonic acid has a minimum size for its hydrocarbon tail of about 13 carbon atoms, with 18 to 24 carbon atoms being necessary for really good water-proofing. The alkylated malonic acid also should be a liquid or a low melting wax or amorphous solid. Branched chain alkyl malonic acids are particularly effective water-proofing agents for leather. The solid or semisolid alkyl malonic acids are useful when blended with mineral oil, if the resulting blend is a liquid at the temperature at which it is applied and at the temperatures at which the treated leather is used.

An investigation of the phenomena of spew formation on ASA waterproofed leathers has resulted in the discovery of a process for treatment of leather with ASA and the like agents to provide treated leathers which remain free from undesirable spew formation after treatment, and also has resulted in the discovery of the alkylated malonic acid agents which are useful for leather waterproofing.

An object of the present invention is to provide a leather waterproofed with alkylated dibasic acid agents, which leather remains free from undesirable spew formation.

It also is an object of the invention to waterproof leather by treating with compositions containing alkylated dibasic acid agents in an amount such that none of the agent appears as visible solids upon aging of the composition at ordinary temperatures.

Another object is to age a mineral oil blend of alkylated dibasic acid agents which are useful for leather-waterproofing, to remove solid materials which appear in the blend during aging, and then to treat leather with such a processed blend to provide a treated leather which remains free from undesirable spew formation.

A further object is to provide a method for making leather resistant to dynamic penetration by water yet permeable to water vapor, by introducing into the leather an alkylated malonic acid agent.

Still a further object is to provide leather waterproofed by introduction therein of an alkyl malonic acid agent.

All these and other objects will be apparent from the following description including the examples and the attached claims.

It has been found, when employing alkylated dibasic acid agents to provide treated leather resistant to water penetration, that if the agents being employed are free from undissolved solid agents which separate as solids during aging at ordinary temperatures (about 70° to 100° F.), then the resulting treated leather remains free from undesirable spew formation.

In accordance with the invention, the aforesaid and other objects are accomplished by impregnating leather with alkylated dibasic acid agents free of undissolved solid alkylated dibasic acid agents. In one embodiment, the leather is impregnated with an aged blend of a paraffinic mineral oil and alkylated dibasic acid waterproofing agents after the blend has been made free of undissolved solid agents which appear during aging. The resulting impregnated leather desirably is resistant to water penetration and remains free of undesirable spew formation, while at the same time the impregnated leather substantially retains its original porosity, flexibility, and other desirable properties. While particularly applicable to alkenyl succinic acid waterproofing agents and the like, the invention is applicable to treatment of leather with all useful alkylated dibasic acid agents, including alkyl malonic acid agents, to provide water-resistant leathers which remain free of spew formation. The invention also includes an impregnating of leather with alkylated malonic acids possessing waterproofing properties. The alkylated malonic acid agents can be applied with and without being blended with a high-boiling liquid material, although when waterproofed leather free of undesirable spew formation is desired, the alkylated malonic acid agents are freed from undissolved solid agents, desirably by blending with mineral oil, aging the resulting blend, and freeing the aged blend of visible solid agents, prior to treatment of the leather.

To provide waterproofed leather free of undesirable spew, when employing a blend of a high-boiling liquid material and alkylated dibasic acid agents, the blend is aged and freed of undissolved solid agents prior to treatment of the leather. In many instances, when a blend consisting essentially of the agents and a high-boiling liquid material is introduced into the leather, the resulting leather exhibits a better water resistance than when the agents, per se, are introduced or when the agents are introduced in a volatile organic solvent. To provide waterproofed leathers free from undesirable spew, when applying a composition such as a solution of the agents, or a water emulsion of the agents, or the agents directly, one applies to the leather only those agent compositions which contain, at ordinary temperatures, an amount of agent such that none of the agent appears as visible solids upon aging of the composition at ordinary temperatures (70°–100° F.).

As a practical matter, commercially available alkylated dibasic acid agents consist essentially of several agents and generally contain some solid agent in an amount exceeding that solubilized by the accompanying liquid agents. This is readily apparent, for example, if a commercially available ASA agent, such as Casyl B–18, is aged for an extended period of time, there will be noted the appearance of solid particles therein. These solid particles, before treatment of the leather, can be redissolved in many instances by heating. However, when redissolved by heating and, as such, then applied to the leather, such solid agents, after a period of time, lead to formation of some spew on the treated leather.

Thus, to avoid spew, in general one avoids impregnating of the leather with agents which are solids at ordinary temperatures. In particular, one avoids impregnating with those agents which contain, at ordinary temperatures, solid agents in an amount exceeding their solubility in various high-boiling relatively nonvolatile, liquid materials, such as mineral oil and/or liquid alkylated dibasic acid agents, which are co-introduced into the leather. In the present invention, before impregnating the leather, the useful alkylated dibasic acid agents are freed from solid agents insoluble therein at ordinary temperatures. The useful alkylated dibasic acid agents may be made free from undissolved solid agents in a number of ways. For example, preferably the agent is blended with a petroleum oil, such as a mineral oil, and after aging of the blend for a period of time at the temperature at which the treated leather will be used, usually ordinary temperatures, there will be noted an appearance of undissolved solids in the blend. The undissolved solids then are removed by such conventional techniques as filtering, centrifuging, or the like, prior to treatment of the leather. If desired, a seeding with a trace or a minute amount of solids of the blend or the agents themselves being aged permits removal of adequate solid agents after a shorter aging period. In all instances, the aging is for a time period such that, upon a further aging, the blend and/or agents to be applied are substantially free from any further appearance of undissolved solids therein. This means, upon an additional aging of up to about 3 months of aged blends or agents from which undissolved solids have been removed, that substantially no additional transformation to visible solids occurs. In order for leathers treated therewith to remain free from spew, aged blends and aged agents, after undissolved solids are removed therefrom, upon additional aging at the most should develop only a slight cloudiness and otherwise remain substantially free of massive solids and solid particles visible to the naked eye. Generally, aging for at least two weeks or longer of a mineral oil-agents blend, or for about one-half that time for the seeded blend, is sufficient to permit an appearance and a subsequent removal of those solids agents causing a noticeable spew formation, if not removed. In a like manner, instead of using a mineral oil-agents blend, the agents themselves may be aged with those solids which appear therein during aging being removed from the aged blends prior to treatment of the leather. In such cases aging periods somewhat longer than two weeks, frequently at least twice as long as the aging period requisite for mineral oil-agents blends, are necessary. In addition, the removal of transformed solid agents from a mixture of the same in liquid agents, is not easily accomplished. However, removal is possible by such conventional techniques as fractional crystallization, centrifuging, filtering, and the like.

In treatment of leather with the alkylated dibasic acid agents which have been freed from undissolved solid agents therein, any conventional technique for application of alkylated dibasic acid agents may be employed. For example, the alkylated dibasic acid agents free of undissolved solid agents may be applied directly, or may be dissolved in organic solvents and the solution thereof applied, or may be dispersed or emulsified in a liquid, such as water, and these dispersions or emulsions applied, or may be applied while blended with other materials, such as petroleum oil. A blend of a high-boiling liquid material, such as mineral oil, and agents, after freeing from undissolved solid agents, may be applied with or without dilution with additional mineral oil, or solvents, or the like, to a desirable viscosity for application. Conventional application techniques such as spraying, hot-swabbing, fat liquoring, immersion-soaking, drum-stuffing, brushing, and/or roller working of the treating agent or a solution, emulsion, or blend of the agent into the leather, are useful.

The amount of the agents incorporated into the leather depends to a certain extent on the particular agents and the particular leather. Some agents are more effective than others, and some leathers, depending on the processing history and the like of the leather, are more susceptible than others to water-proofing. In general, conventional amounts of agents are introduced into the leather. In many instances, leathers impregnated with amounts of the agents as low as about 2 to 3 percent by weight [1] of the leather are noticeably resistant to water penetration under dynamic conditions. Satisfactory waterproofing for most applications is obtained by impregnating leathers with up to about 20 percent by weight of the agents. While impregnation of leather with somewhat larger amounts of agents is possible, generally these larger amounts are undesirable as being detrimental to retention of desirable properties, such as porosity, of the leather. With impregnated amounts of up to about 20 percent, the mechanical properties of the treated leather are substantially unmodified from the untreated leather. Preferred waterproofed leathers contain from about 5 to 15 percent of alkylated dibasic acid waterproofing agents.

In the description of the invention and in the appended claims, by the terminology "alkylated dibasic acid agents" for waterproofing leather, there is intended to include all agents for waterproofing leather which are dibasic acid derivatives of low water solubility selected from the alkyl malonic acids, the alkyl, alkylidene, and alkenyl succinic acids, and the anhydrides, partial-esters and partial-soaps of said alkyl, alkylidene, and alkenyl succinic acids. Included are alkylated dibasic acid agents, such as alkylated succinic acid agents, which are recognized waterproofing agents for leather, and also included are the more recently discovered useful alkyl malonic acid agents. Illustrative of the recognized alkylated dibasic acid agents are the alkylated succinic acid agents, for example, $C_{18}$ASA's, described in U.S. Patent No. 2,693,996, Von Fuchs. Useful malonic acid agents are alkyl malonic acids having an alkyl radical of from about 13 to 30 carbon atoms as a substituent on the nonacidic carbon atom, which alkyl substituted malonic acid agents are of low water solubility.

A number of useful alkylated dibasic acid agents are commercially available. ASA agents can be prepared by an aforedescribed reaction of an olefin with maleic anhydride. In addition, ASA agents may be prepared by the Stobbe condensation wherein an aldehyde is condensed with diethyl succinate in the presence of a strong base such as potassium tertiary butoxide. The condensation may be repeated to substitute a second hydrocarbon tail on the substituted diethyl succinate and then the ester groups removed by hydrolysis. Other methods of preparation of such ASA's and their derivatives are known to the art and a number of the ASA compounds are reported in literature.

A somewhat smaller number of the alkylated malonic acids (AMA) and their derivatives and methods of preparation of the same are reported in literature, and apparently the AMA compounds reported in literature heretofore have not been taught to be useful waterproofing agents for leather. Like the ASA shorthand notation for the alkenyl succinic acids, an "AMA" shorthand notation is useful to describe the alkyl malonic acid (AMA) compounds. A useful method for preparation of AMA's is a modification of the condensation of alkyl halides with the sodium derivative of diethyl malonate (D. A. Shirley, Preparation of Organic Intermediates, John Wiley & Sons, 1951). For example, an alkyl bromide may be condensed with a di(lower alkyl) ester of malonic acid to obtain a di(lower alkyl) ester of an alkyl substituted malonic acid which then is saponified to the corresponding AMA. Such an AMA in which the alkyl portion contains from about 13 to 30 carbon atoms, is a useful agent. The just-described method is particularly useful for preparing branched-chain AMA agents. Another method for preparing some AMA agents is the Knoevenagel reaction wherein a diester of malonic acid is condensed with an aldehyde in the presence of a basic catalyst and followed by hydrolysis to provide an alkylidene malonic acid. Another method for preparing some AMA agents is to condense ethyl cyanoacetate (or other cyanoacetate ester) with an alkyl halide in a manner similar to the condensation with diethyl malonate. Other methods also known in the art may be used to prepare useful AMA agents characterized by an alkyl constituent of from about 13 to 30 carbon atoms on the nonacidic carbon atom of the malonic acid. Preferred AMA agents contain about 18 to 24 carbon atoms in their hydrocarbon tail (alkyl substituent). Particularly preferred are those AMA's which in a free state are liquid at ordinary temperatures (about 70°–100° F.).

In the following description of the invention, all values for resistance to water penetration of various impregnated and untreated leathers are determined by a water penetration test in which rectangular pieces, about 5 inches by 5 inches, of leather are repeatedly flexed about 90 times per minute with the grain surface of the leather in contact with water. The rectangular test pieces, folded along their major axis at about midway of their minor axis into a V-shaped trough configuration, are mounted in a modified Maeser dynamic water penetration machine. The grain side of the leather test piece faces outward in contact with water at the outer centermost portion of the V-shaped trough piece constantly during the repeated flexing. A Maeser machine, very similar to that described in J. Am. Leather Chem. Assoc., 42, 390–408 (1947), except for modification of the test piece clamps to provide the unique clamping and positioning described in U.S. Patent 2,917,921, Neher, is used. An electrical end-point detection system is used to determine failure of the test pieces. This system closely resembles that described in J. Am. Leather Chem. Assoc., 51, 377–87 (1956), and includes electrolytic nickel shot (about 1/8-inch nominal diameter) as the contact medium inside the leather test piece and a resistance of 20,000 ohms through the leather at the point of failure. Unless expressly stated otherwise, all tests are conducted at ordinary temperatures, 70°–100° F., and all water resistance values are the average of at least four tests and are reported in average kilocycles of testing before failure with each cycle including one flexing of the leather test piece.

*Example I*

The waterproofing agent employed in this example is a complex mixture of $C_{18}$ alkenyl succinic acids from hydration of a mixture of $C_{18}$ alkenyl succinic anhydrides

---

[1] The terms "parts" and "percent," as used in the specification and claims, are expressed as parts and percent by weight unless otherwise expressly indicated.

which are produced from reacting maleic anhydride with a mixture of $C_{18}$ olefins. The mixture of $C_{18}$ olefins used in the preparation of the alkenyl succinic anhydrides contained a 6 to 9 percent alpha olefin content.

About 2 parts by weight of this $C_{18}$ ASA waterproofing agent are blended with one part by weight of a light colored, 100/100 SUS viscosity, mineral oil and heated with stirring to a temperature of about 95° C. until completely dissolved with a clear homogeneous solution being obtained, generally well before the temperature reaches 95°C. At this time, the blend is permitted to cool to room temperature (about 75° F.). The room-temperature blend appears upon visual examination to be a clear, homogeneous, solution and is divided into three portions. A first portion is used immediately to treat the grain side of a piece of a bovine, buffed, chrome-tanned, medium-vegetable-retanned, corrected grain, crusted, shoe upper leather. A second portion, still remaining clear for one hour after reaching room temperature, then is filtered through a medium porosity sintered glass filter. After filtration, the filtered second portion is used immediately to treat another piece of the same leather. A third portion of this apparently clear solution or admixture is permitted to age at room temperature for about two weeks. At this time, there are observed solid and gel-like particles present in this aged third portion. These particles are filtered from the mixture, using a medium porosity sintered glass filter. Based on the amount of solids and gels filtered from this aged solution, approximately 7 percent of the $C_{18}$ alkenyl succinic acids blended in the mineral oil are removed by this aging plus filtering. This filtrate is clear and is used to treat another piece of the same leather. Treatment of the leather pieces with the first, second, and third portions involves: addition of mineral oil of a 110/100 SUS viscosity to each portion to adjust to an equal part by weight admixture of agents and mineral oil; brushing the admixture upon the grain side of the leather; permitting it to be absorbed by the leather; and rebrushing of additional admixture on the leather with additional absorption into the leather until a pickup of about 10 percent by weight of the agent plus mineral oil by the leather is obtained. At the conclusion of the admixture applications, the amount of introduced agent is determined by difference in weight measurements of the leather sample before and after treatment. All samples of the treated leathers are stored under atmospheric conditions at room temperature in a closed drawer until examined and tested as described below.

After less than about 2 weeks, a white-like powdery exudate or spew is observed to have formed on the grain surface of the leather pieces treated with the first and second portions. When this spew is wiped off and the leather permitted to stand, additional spew forms on the leather's surface within several weeks. In replicates of this example, it later is observed that such a spew formation commences to form within one to two days after treatment of the leather with like first and second portions. No exudate or spew is observed on leather treated with the third portion when examined about two weeks after treatment, and also when examined as long as six months after treatment of the leather.

All leathers treated with the first, second, and third portions, upon testing for resistance to water penetration by the aforedescribed modified Maeser dynamic water-penetration tester, exhibit substantially the same water resistance. The dynamic water resistance averages about 56,000 cycles before failure for the leather treated with the first portion; about 56,000 cycles before failure for the leather treated with the second portion; about 68,000 cycles before failure for leather treated with the third portion, all results being substantially of the same order of magnitude and being within the reproducibility limits for replicate tests with this tester.

*Example II*

In a manner like that of Example I, the complex mixture of $C_{18}$ alkenyl succinic acids of Example I is blended in a two-to-one ratio by weight with mineral oil to prepare an apparently clear homogeneous solution after heating, with stirring, on a hot plate. This apparently clear blend, after cooling to room temperature, is seeded with a minute amount of the solid or gel-like particles removed by the filtering of the third portion in Example I. The seeded blend then is aged at room temperature in a closed container for about one week, whereupon there is observed to be a significant amount of solid and gel-like particles therein. These particles are removed by filtering through a medium porosity sintered glass filter and a portion of the clear filtrate applied in the manner described in Example I to leather. Leather waterproofed with this portion of the clear filtrate averages about 60,000 cycles before failure on the aforedescribed modified Maeser tester. No exudate or spew formation is noted on leather so treated, when examined at various times during a one year period following treatment of the leather. Other portions of this filtrate are permitted to age at room temperature and then are examined. After aging, the aged filtrate remains apparently clear upon visual examination for periods approaching one year, with only a slight trace of cloudiness developing in the solution near the end of the first year of aging. At various time intervals during the aging of this filtrate, portions of the aged filtrate are applied to leathers in the manner described in Example I. No exudate or spew formation is noted on leathers so waterproofed, when the leathers are examined at periods up to several months after their treatment, even on leathers treated with a slightly cloudy, one-year aged filtrate.

*Example III*

A commercially available partially isomerized $C_{18}$ alkenyl succinic acid is applied to a chrome tanned, mordanted cowhide leather to introduce 6–8 percent by weight of the ASA agent into the leather. Another portion of the same commercially available $C_{18}$ alkenyl succinic acid is separated into liquid and solid fractions by repeated filtrations and fractional crystallizations from a solvent, such as Skellysolve C, with removal of the solvent in a rotary evaporator. "Skellysolve C" is paraffinic hydrocarbon solvent of a boiling point range of 186°–212° F. The liquid fraction of this ASA agent is applied to a like leather to introduce about 8 percent by weight of this ASA agent into the leather. Both leathers, so treated, exhibit water resistance when subjected to the aforedescribed modified Maeser dynamic water penetration test. Within less than several weeks, spew is observed to have formed on the leather treated with the comercially available agent, while, after several months, no spew is observed on the leather treated with the liquid fraction of this agent.

*Example IV*

A quantity of the same $C_{18}$ASA agent, as employed in Example I, is permitted to stand in a closed container at ordinary temperatures for about four months, whereupon solid and gel-like particles are observed in the aged $C_{18}$ASA agent. A liquid upper portion, relatively clear and free of such formed particles, is decanted from the container containing the aged $C_{18}$ASA agent and this liquid upper portion centrifuged. After centrifuging, a clear liquid fraction is decanted from the centrifuged portion. After this clear liquid fraction is aged for up to about one month, no appearance of solid and gel-like particles is noted therein. This clear liquid fraction then is employed as the waterproofing agent in this example.

Leathers are treated with blends of U.S.P. mineral oil and the liquid fraction derived by removing solids from the aged original $C_{18}ASA$ agent. With introduced amounts of from about 2 to 20 percent of the untreated leather weight, the resulting treated leathers exhibit significant water resistance upon the aforedescribed modified Maeser dynamic water penetration test. In addition, the treated leathers remain free of spew formation on their surfaces for at least as long as three months after the agent is introduced therein. In comparison thereto, treatments of like leathers in like manners with the same $C_{18}ASA$ agent, except not aged and not having solids removed therefrom, result in treated leathers which show a significant spew formation within less than several weeks, although these treated leathers exhibit substantially equivalent water resistance.

*Example V*

A mixture is made of equal parts of commercially available $C_{18}ASA$ and $C_{21}ASA$ agents. This mixture is blended with substantially equal parts of a paraffinic mineral oil; the resulting blend is aged for at least one week; and the undissolved solids appearing during the aging removed by filtering from the aged blend. The resulting blend is subjected to repeated steps of aging and removal of undissolved solids until a resulting blend, upon aging, remains free of appearance of undissolved solids therein for as long as three months. Whereupon, the blend, which now is substantially free of amounts of insoluble solids causing spew formation, is introduced into various leathers. In all instances, the resulting treated leathers exhibit substantial water resistance and remain free of spew formation for longer than six weeks under environmental conditions at ordinary temperatures. In contrast thereto, like blend of mineral oil and these two commercially available agents except not subjected to aging and undissolved solids removal, upon application to like leathers by the same application techniques, results in leathers which show a spew on their surface within less than six weeks under environmental conditions at ordinary temperatures.

*Example VI*

Isoeicosylmalonic acid is prepared as follows: Isoeicosenal, obtained by the aldol condensation of isodecaldehyde, is hydrogenated to isoeicosanol while admixed with dioxane in the presence of a Raney nickel catalyst in an autoclave in a temperature of 92° to 102° C. over a period of 5½ hours. The hydrogenated product after filtering free of catalyst is vacuum distilled at a pressure of 0.35 to 0.6 mm. of mercury with the fraction which distills between 142° C. to 158° C. being employed as the isoeicosanol in the following procedure. This isoeicosanol is converted to isoeicosyl bromide by treatment with hydrogen bromide. The isoeicosyl bromide and diethylmalonate then are used to prepare diethylisoeicosylmalonate. Diethylmalonate, which has been stored over a drying agent, is added to a reflux vessel charged with ethyl alcohol previously refluxed in the presence of sodium. After the addition of the diethylmalonate is completed, an equal molar amount of isoeicosylbromide is added dropwise to the stirred mixture which is maintained at reflux temperature. Following completion of the addition of the isoeicosyl bromide the resulting mixture is allowed to stand overnight and then again heated to reflux temperature for a period of four hours. Thereupon a large proportion of the ethyl alcohol is distilled off; the residue placed in a separatory funnel, diluted with water, and then extracted with ethyl ether. The ether extract is washed twice with distilled water, once with dilute hydrochloric acid, then twice more with distilled water, with the final washing being slightly basic to litmus paper. The ether extract is separated from the alcohol solvent therein by evaporation of the alcohol in a rotary evaporator and the resulting material vaccum distilled. Material distilling at a pressure of 0.4 to 0.35 mm. of mercury between the temperatures of 162° to 190° C. taken as the diethylisoeicosylmalonate product used in the following procedure. This diethylisoeicosylmalonate product along with an alcoholic potassium hydroxide solution and a small amount of water is refluxed for six hours and then allowed to stand about sixty hours. The product is diluted with water and ethyl ether, and then made acidic with dilute hydrochloric acid. The ether phase is separated from the aqueous phase and the aqueous phase extracted with ethyl ether. The extracted ether phase and the ether extracts are combined and washed with water, with the last water wash being neutral to litmus paper. The ether solvent is removed by evaporating in a rotary evaporator to yield a material which analyzes 81.4 percent isoeicosylmalonic acid. This crude product is again refluxed for three hours with an ethyl alcohol potassium hydroxide solution containing a small amount of water and, after dilution with water, is extracted with ethyl ether and made acidic with dilute hydrochloric acid. This product analyzes better than 93 percent pure isoeicosylmalonic acid and is found to be a useful waterproofing AMA agent for leather.

Equal parts of this isoeicosylmalonic acid and a light-colored, 110/100 SUS viscosity, paraffinic mineral oil are blended by stirring and heating to a temperature of about 95° C. The resulting blend, after cooling to about 80° F., is applied by roller to the grain surface of chrome-tanned, vegetable retanned, corrected-grain, crusted shoe-upper leather to provide pieces of treated leather having about 8 percent and 11 percent by weight, respectively, of the isoeicosylmalonic acid by weight of treated leather introduced therein. These leathers on the modified Maeser dynamic water resistance tester average about 3,000 cycles for the leather treated to the 8 percent level before failure, and about 6,000 cycles for the leather treated to the 11 percent level before failure. No spew is observed on these treated leathers several months after treatment with the isoeicosylmalonic acid-mineral oil blend. For comparison purposes the same leather in the untreated state averages less than 300 cycles before failure on the modified Maeser dynamic water resistance tester.

*Example VII*

An amount of 0.8 part of isoeicosylmalonic acid agent (iso-$C_{20}AMA$), prepared as described in Example VI, is dissolved in 1.2 parts by weight of high-flash naphtha. The resulting solution containing dissolved agent is applied by roller to the grain surface of a chrome-tanned, vegetable retanned, corrected grain, crusted shoe-upper leather to introduce an amount of the agent of about 6 percent by weight of the leather. The resulting treated leather is dried for 4 hours at 60° C. and then permitted to stand for two days before checking for water resistance. The treated leather exhibits an average of about 9,000 cycles before failure on the modified Maeser tester. No spew is observed on the treated leather after one month.

*Example VIII*

By the same general procedure as described in Example VI, a straight-chain alkyl derivative of malonic acid is prepared by reacting diethylmalonate and octadecyl bromide and saponifying the resulting product. The final product, the n-$C_{18}AMA$ agent employed in this example, is a solid of a melting point of 121.5–123.0° C. possessing only moderate solubility in mineral oil.

A solution containing 10 percent by weight of the thus prepared straight-chain alkyl derivative of malonic acid is achieved by dissolving in a 65 percent mineral oil-35 percent tertiary butyl alcohol mixture. Leather treated to introduce about 3.5 percent by weight of the solvated solid AMA agent exhibits a water resistance averaging about 5200 cycles before failure by the modified Maeser tester. Leather so treated develops a substantial amount of spew on its surface within a few days after introduction of the AMA agent. Like leather, except not treated to impart water resistance, averages less than 500 cycles before failure by the modified Maeser tester.

*Example IX*

A mixture of $C_{18}$ and $C_{20}$AMA's, as prepared in Examples VIII and VI, a major proportion being $C_{20}$AMA, is blended with equal parts of a paraffinic mineral oil and shortly after blending applied to various leathers to introduce conventional amounts of agent into the leather. The treated leathers are found to exhibit significant water resistance when tested on the modified Maeser tester at ordinary temperatures. The treated leathers, upon standing at ordinary temperatures, for periods of time, periods as short as several weeks are found to develop spew on their treated surfaces. If prior to treatment of the leathers, this blend of mineral oil and mixture of $C_{18}$ and $C_{20}$AMA's is aged for about one month and the solids appearing therein removed, the resulting treated leathers exhibit a significant water resistance and no evidence of spew up to one month after treatment.

*Example X*

A mixture of equal parts of the $C_{18}$AMA as employed in Example VIII and the $C_{18}$ASA as employed in Example I is blended with one part of a paraffinic mineral oil and the blend aged at ordinary temperatures for one month. At this time, the blend is filtered to remove therefrom solids which become apparent therein during the aging. The filtered blend is diluted with additional mineral oil to provide a blend containing about 50 percent by weight of the aged and filtered agent, and this blend applied to various leathers to introduce between 4 to 12 percent of agent into the leathers. The treated leathers exhibit water resistance. The treated leathers, upon standing at ordinary temperatures for periods of time as long as one month and longer, are found to be free of spew on their treated surfaces.

While a number of different types of leathers are illustrated in the preceding specific examples as being made resistant to dynamic water penetration by introduction therein of alkyl and alkenyl dibasic acid agents according to the process, other types of leathers are susceptible to treatment. Of course, different types of leathers vary in their response to the introduced alkylated dibasic acid agents with some particular agents being of much greater effectiveness in providing water resistance for some leathers than for other leathers. In general, at least one or more alkylated dibasic acid agents will waterproof effectively such types of leathers as: bovine, buffed, chrome-tanned, medium vegetable retanned, corrected grain, crusted shoe upper leather; full grain, chrome-tanned, calfskin, shoe upper leather; full grain vegetable tanned, cowhide sporting goods leather; full grain, chrome-tanned, vegetable-retanned, goat-skin leather; full grain, chrome-tanned, kid skin leather; full grain, chrome-tanned, vegetable-retanned, sheepskin leather; full grain chrome-tanned, resin retanned cowhide leather; vegetable retanned, and the like. The invention includes a waterproofing of leathers to an extent that articles fabricated thereof, such as shoes, will have not only the uppers but the leather soles thereof resistant to dynamic water penetration.

Various changes and modifications of the invention will be apparent and obvious to those skilled in the art in light of the foregoing description and examples. All such changes and modifications that fall within the true spirit and scope of the invention are intended to be included, and it is intended to limit the invention only as set forth in the appended claims.

What is claimed is:
1. The process, to avoid spew formation in leather being made resistant to water penetration by alkylated dibasic acid agents, comprising:
   (a) aging said agents to be introduced until substantially free from further appearance of undissolved solids therein;
   (b) removing, from the aged agents, undissolved solids apparent therein after the aging to provide agents substantially free of undissolved solids; and
   (c) then introducing the agents, substantially free of undissolved solids, into the leather.
2. The method of claim 1 in which the agents are aged while blended with a high-boiling liquid material until the blend is substantially free from further appearance of undissolved solids therein, and wherein undissolved solids appearing during the aging are removed from the blend, and then such a treated blend is introduced into the leather.
3. The method of claim 2 employing mineral oil as the high-boiling liquid material.
4. The method of claim 2 in which the aging of said agents is of a blend of mineral oil and the agents containing a minute amount of an undissolved solid seed material.
5. In making leather resistant to water penetration by introducing into the leather agents which are alkylated succinic acid derivatives of low water solubility selected from the group consisting of alkyl, alkylidene, and alkenyl succinic acids and their hydrides, partial esters, and partial soaps, which alkylated succinic acid derivatives contain a hydrocarbon group of from 13 to 30 carbon atoms substituted on a nonacidic carbon atom of succinic acid, the improvement of:
   (a) pretreating the agents introduced into the leather and introducing pretreated agents substantially free of undissolved solid agents, the pretreating including an aging until substantially free from further appearance of undissolved solid agents and,
   (b) after aging, removing the undissolved solid agents therefrom.
6. The process of claim 5 in which the pretreating of said agents includes: blending the agents with mineral oil; aging the blend for at least one week at ordinary temperatures of from 70–100° F.; filtering the aged blend to remove undissolved solid agents appearing during the aging; and repeating the aging and filtering step, as necessary, until there is obtained a filtrate which remains usbstantially free from further appearance of undissolved solids therein when aged additionally at the ordinary temperatures for at least several months.
7. The process of claim 6 in which the employed agents are $C_{18}$ alkenyl succinic acid agents.
8. In making leather resistant to water penetration by introducing into the leather agents which are alkyl malonic acids containing an alkyl group of from 13 to 30 carbon atoms substituted on the nonacidic carbon atom of malonic acid, the improvement of:
   (a) pretreating the agents being introduced into the leather so as to introduce agents substantially free of undissolved solid agents, the pretreating including an aging until substantially free from further appearance of undissolved solid agents and,
   (b) after aging, removing the undissolved solid agents therefrom.
9. The process of claim 8 in which the pretreating of said agents includes: blending the agents with mineral oil; aging the blend for at least one week at ordinary temperatures of from 70–100° F.; filtering the aged blend to remove undissolved solid agents appearing during the aging; and repeating the aging and filtering steps, as necessary, until there is obtained a filtrate which remains free from further appearance of undissolved solids therein when aged additionally at the ordinary temperatures for at least several months.

10. The process of claim 9 in which the employed agents are $C_{18}$ alkyl malonic acid agents.

11. A method of making leather resistant to water penetration, which method comprises:
(a) introducing into the leather an alkyl malonic acid of low water solubility containing an alkyl group of from 13 to 30 carbon atoms substituted on the nonacidic carbon atom of malonic acid.

12. The method of claim 11 in which there is introduced said alkyl malonic acid in an amount of from about 2 to 20 percent by weight of the leather.

13. The method of claim 11 in which alkyl malonic acids which are liquids at ordinary temperatures of from 70–100° F., are introduced.

14. The method of claim 11 employing the alkyl malonic acid, which is a liquid at temperatures of from 70–100° F., and which contains about 22 carbon atoms in the alkyl group substituted on the nonacidic carbon atom.

15. The method of claim 11 in which said malonic acid derivative is blended with mineral oil and this blend is introduced into the leather.

16. The method of claim 15 in which there is introduced a $C_{18}$ alkyl malonic acid.

References Cited by the Examiner

UNITED STATES PATENTS

| | | | |
|---|---|---|---|
| 2,693,996 | 11/1954 | Von Fuchs | 8—94.22 |
| 2,741,597 | 4/1956 | Oosterhaut | 260—537 X |
| 2,798,093 | 7/1957 | Stein | 260—537 X |
| 3,002,019 | 9/1961 | Lum | 260—537 X |

OTHER REFERENCES

Wilson: Modern Practice in Leather Manufacture, pp. 490–491, published 1941, by Reinhold Publ. Corp., N.Y.C.

Bailey: Industrial Oil and Fat, 2nd edition, 1951, pp. 867–877, pub. by Interscience Pub. Inc., N.Y.C.

Progress in Leather Science, 1920–1945, pp. 646–649, pub. by British Leather Manufacturers' Research Assoc., London, England.

NORMAN G. TORCHIN, *Primary Examiner.*

D. LEVY, *Assistant Examiner.*